Figure 1:
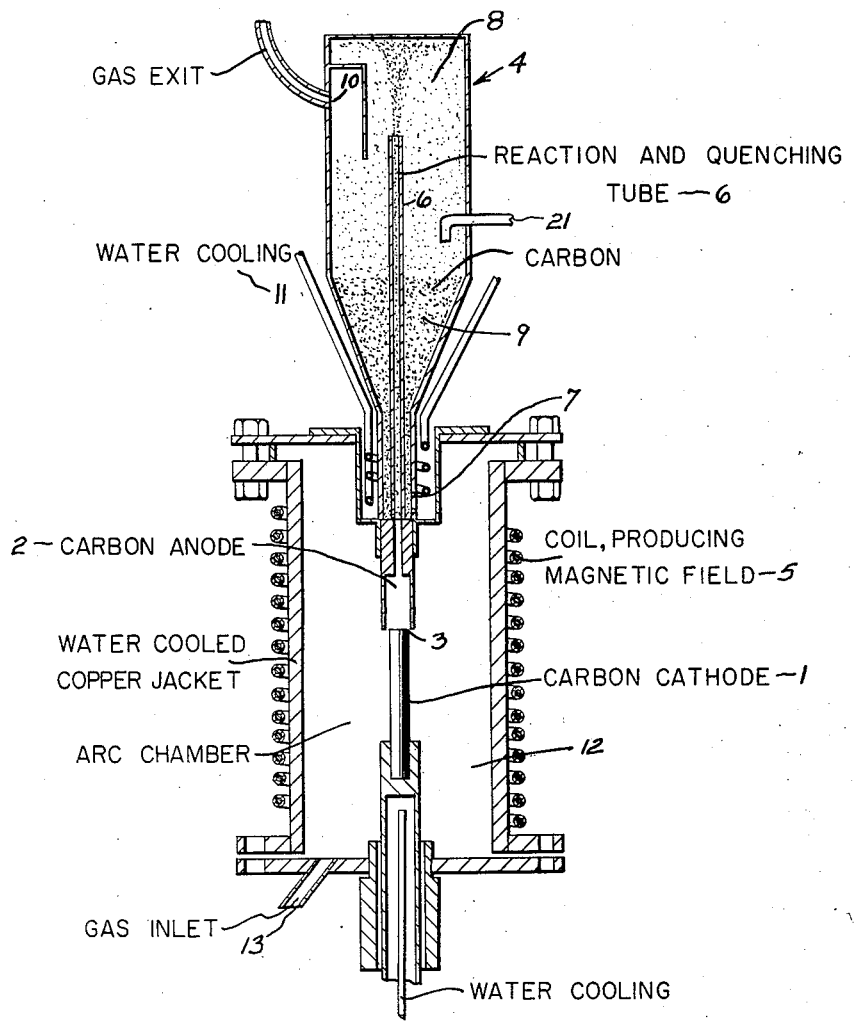

Sept. 16, 1958     J. T. DENISON ET AL     2,852,574
PREPARATION OF TETRAFLUOROETHYLENE
Filed June 15, 1955                2 Sheets-Sheet 1

INVENTORS
JACK T. DENISON
FRANK E. EDLIN
GEORGE H. WHIPPLE
BY
ATTORNEY

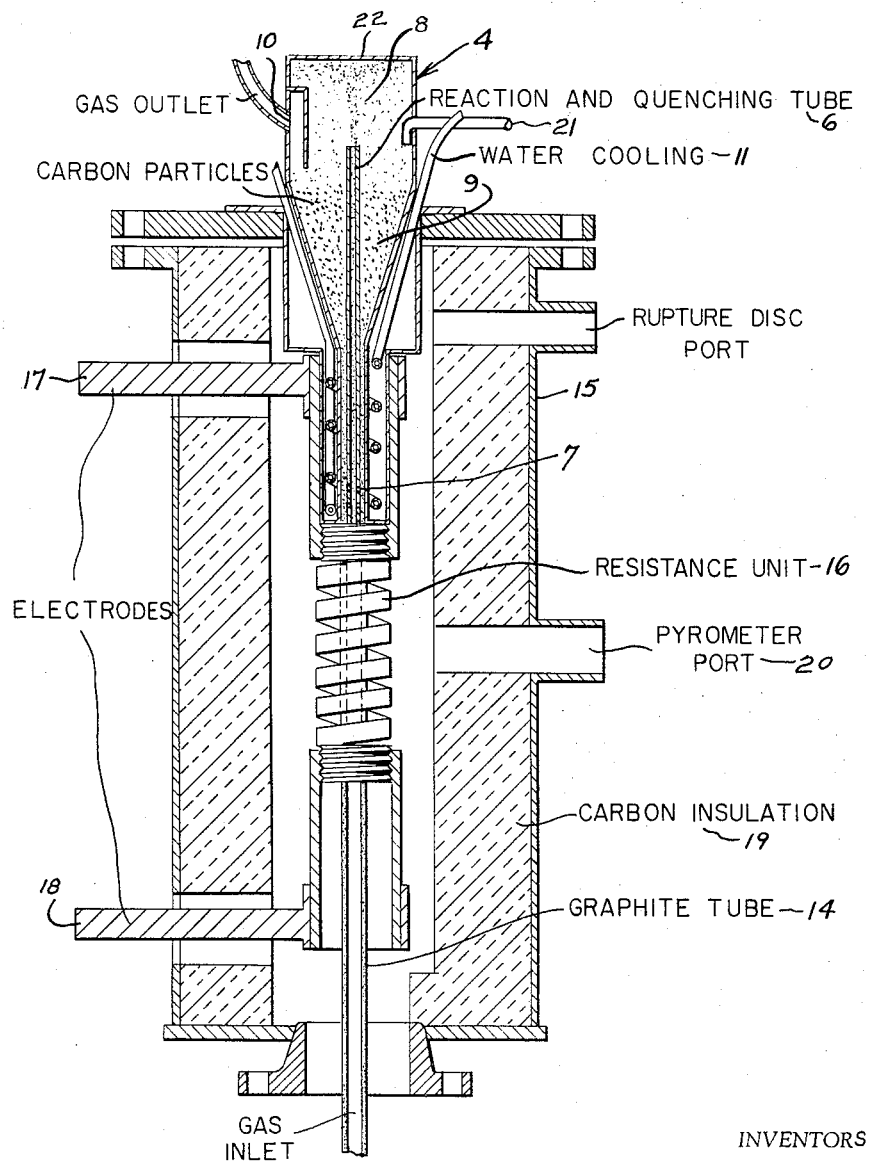

United States Patent Office 2,852,574
Patented Sept. 16, 1958

2,852,574

PREPARATION OF TETRAFLUOROETHYLENE

Jack Thomas Denison and Frank Edward Edlin, Wilmington, Del., and George Henry Whipple, West Chester, Pa., assignors to E. I. du Pont de Nemours and Company, Wilmington, Del., a corporation of Delaware Application June 15, 1955, Serial No. 515,738

15 Claims. (Cl. 260—653)

This invention relates to an improved process for preparing tetrafluoroethylene.

Compounds which contain only fluorine and carbon, commonly referred to as fluorocarbons, possess considerable utility in many fields of applied chemistry, for example, as refrigerants, dielectric fluids, intermediates for polymeric materials, propellants in aerosol compositions, etc. One of these fluorocarbons, tetrafluoroethylene, has achieved great commercial success in the form of its polymer. Polytetrafluoroethylene is an extremely tough, corrosion resistant plastic with excellent electrical insulating properties, that has found important applications as an insulating material, as a construction material useful particularly at high temperatures and under corrosive conditions and as a bearing material. However, the relatively high cost of synthesis has prevented the use of this polymer in a wider variety of commercial applications.

Recently, novel processes for preparing fluorocarbon compounds including tetrafluoroethylene have been discovered in which inorganic fluorides as well as organic fluorine compounds are reacted with carbon at very high temperatures, above 900° C. to form a variety of fluorocarbon compounds. It was found in these experiments that in order to produce commercially important quantities of tetrafluoroethylene the temperature had to be raised to 1700° C., and that higher temperatures than 1700° C. improved the yield of tetrafluoroethylene, provided that the reaction products were rapidly quenched to below 500° C.

It is the object of the present invention to provide an improved process for the preparation of tetrafluoroethylene. It is furthermore the object to provide a novel process for preparing tetrafluoroethylene.

The objects of the present invention are accomplished by a process wherein an inorganic gaseous fluoride or a gaseous organic fluorine compound is heated to 1700° C. and higher, and wherein the resulting gaseous products are reacted with excess carbon in the form of finely divided particles, said carbon being at a temperature below 500° C. This process is based on the discovery that the hot reaction products, obtained by heating inorganic gaseous fluorides or organic fluorine compounds, when contacted with an excess of carbon at a temperature at which tetrafluoroethylene is stable will give a better yield of tetrafluoroethylene than can be obtained by any other method known heretofore. The surprising results of the present invention are explained by the following theory, which is given here only for a better understanding of the invention. It is believed that by heating gaseous inorganic fluorides or organic fluorine compounds to temperatures above 1700° C. unstable fluorine compounds or radicals such as monoatomic fluorine, carbon fluoride, carbon difluoride or carbon trifluoride are formed. When using an inorganic fluoride, the fluorocarbon radicals may be formed by interaction of the inorganic fluorides with carbon present in the reaction zone. These radicals, if cooled down slowly, have a tendency to form carbon tetrafluoride in preference to tetrafluoroethylene. However, rapid cooling to temperatures at which tetrafluoroethylene is stable; e. g., approximately 500° C. results in an increase of the reaction rate leading to the formation of the tetrafluoroethylene, and thus to a greater yield of tetrafluoroethylene. This reaction rate is surprisingly increased when the hot pyrolysis products are contacted with excess fluidized carbon. Evidently the contact with excess fluidized carbon not only gives good quenching (which can also be obtained with other fluidized inert solids) but also effects a reaction of said carbon with the monoatomic fluorine formed in the hot zone, and this results in the rapid formation of tetrafluoroethylene. Temperatures above 1700° C. are necessary to prevent the formation of excessive amounts of carbon tetrafluoride which is more rapidly formed than tetrafluoroethylene at temperatures of 500 to 1600° C. However, when monoatomic fluorine is obtained in the absence of any carbon in the hot zone, lower reaction temperatures can be employed to prepare tetrafluoroethylene by rapidly bringing the monoatomic fluorine into contact with excess fluidized carbon at temperatures below 500° C.

The inorganic fluorides and the organic fluorine compounds which can be used in the present invention encompass a large class of compounds. It is possible to use any inorganic fluoride or organic fluorine compound that will decompose substantially and give monoatomic fluorine or fluorocarbon radicals or will react with carbon present in the pyrolysis zone to form fluorocarbon radicals at temperatures above 1700° C. and below the upper temperature limits available in the pyrolysis unit employed. The decomposition temperatures required may be calculated from thermodynamic data or obtained by spectroscopy. The pyrolysis of the fluorine compounds is preferably carried out with compounds which can be introduced to the pyrolysis unit in a gaseous or vaporized state; however, it is also possible to employ a finely divided solid fluoride suspended in an inert atmosphere. Certain compounds are preferred because of their high ratio of fluorine atoms and the extent to which the compounds are decomposed, thus forming a larger number of unstable fluorine radicals or because of the nature of the decomposition products which may be recycled or regenerated to starting materials. The fluorine compounds preferred include the inorganic fluorides of the elements of group VA and those elements of the group VIA having atomic numbers between 16 and 52 inclusive of the Periodic Table such as phosphorus pentafluoride, sulfur hexafluoride, arsenic trifluoride, nitrogen trifluoride, etc., and such organic fluorides as tetrafluoromethane, hexafluoroethane, carbonyl fluoride, and cyclic and unsaturated fluorocarbons other than tetrafluoroethylene. The heating of the starting material may be carried out in the presence or in the absence of carbon in the hot zone. In general, it is preferred to carry out the decomposition of the fluorides used as starting materials in the presence of carbon as prior art processes have shown. In view of the fact that carbon is one of the few materials that is solid and stable at the high temperatures required, it is the preferred material to be used in the construction of heating sources, as described in greater detail hereinbelow. Although prior art processes have shown that in the presence of carbon in the hot zone tetrafluoroethylene can be formed from the fluorides listed hereinabove, the surprising effect of relatively cold carbon in a finely divided form on the hot reactant gas stream constitutes a highly useful improvement.

The reaction product obtained on separation from the carbon consists primarily of the starting material or its decomposition product and fluorocarbon compounds. The preponderant components of the fluorocarbon compounds obtained are tetrafluoroethylene and carbon tetrafluoride. The composition of the fluorocarbon compounds is determined by the reaction conditions employed. Under highly favorable conditions yields of tetrafluoroethylene as high as 80–90% on the basis of the fluorocarbon compounds formed are obtained. In general, minor amounts of hexafluoropropene and other higher unsaturated and saturated fluorocarbon compounds are formed. The extent to which the fluorocarbon compounds are formed depends on the extent the starting material is decomposed in the hot zone. Certain inorganic fluorides and organic fluorine compounds such as phosphorus pentafluoride, carbon tetrafluoride and hexafluoroethane decompose readily and extensively at lower temperatures in the range of 1000–2500° C., and these compounds are highly useful in conventional heat conduction furnaces, generally limited to temperatures below 2500° C. Other fluorides are more suitably employed at high temperatures of the hot zone such as produced by an electric arc.

The undesirable by-product fluorocarbons obtained in the process can be recycled together with any unreacted starting inorganic fluoride or organic fluorine compound, to produce more tetrafluoroethylene. This is an especially desirable aspect of the process of this invention since by such recycling of by-product complete conversion of the starting fluorocarbon to the desired tetrafluoroethylene can be accomplished. Similarly as the by-product can be recycled, the unreacted inorganic starting compounds can be recycled.

The present process is particularly well suited for large scale operations. Although heretofore it has been possible to obtain high yields of tetrafluoroethylene by heating inorganic fluorides at high temperatures in the presence of carbon on a small scale, such yields have decreased as the scale was increased or as the input was increased. The present process is not limited to the size of the equipment employed and can be scaled up to any size feasible from the engineering standpoint.

Figures 1 and 2 of the attached sectional drawings show in more or less diagrammatical form two means of carrying out the process of the present invention.

In a preferred embodiment of this invention, Fig. 1, the process is carried out by passing the gaseous inorganic fluoride or organic fluorine compound used as the starting material through an arc produced by passing an electric current between two graphite or carbon electrodes (1), (2). The temperature of the arc is estimated to be above 3000° C. To insure the necessary contact of all of the starting material with the arc, and thus provide uniform heating of the gas to be decomposed, a magnetically rotated arc is used which rotates in a circular gap (3) provided by the electrodes and through which gap all of the gas must pass prior to leaving the chamber. The rotating arc is disclosed in greater detail hereinbelow and in copending application Serial No. 515,705, filed June 15, 1955. As illustrated in the attached drawing, Figure 1, the gas must pass through the gap (3) in which the arc is estimated to rotate at the rate of 1000 to 10,000 revolutions per second, thus insuring homogeneous heating and also imparting a high velocity on the outgoing reactant gases. The reactant gases at a temperature not very much lower than the furnace temperature are then contacted with a source of carbon particles sufficiently small to be drawn into the gas stream and which are at a temperature below 500° C., at which temperature tetrafluoroethylene is stable. The contact of the hot reactant gas stream with the relatively cold carbon results in the rapid cooling of the gases and in a higher conversion to tetrafluoroethylene after the gases have been cooled.

In another embodiment of this invention, as illustrated in Fig. 2, the process is carried out by passing the gaseous inorganic fluoride or organic fluorine compound used as the starting material through a cylindrical graphite tube (14) heated to a temperature of about 1700–2500° C. and preferably at a temperature of about 2000–2300° C. by an electric resistance furnace (15) and then forcing the gas through a narrow short passage into the carbon quench reactor (14) described hereinbelow in greater detail. The heated gas is forced through a narrow passage to further increase the linear velocity of the gas, so that the gas is able to draw in a large excess of the finely divided carbon.

Although a heated graphite tube or a carbon arc is preferred in the process of the present invention, the organic fluorine compounds or inorganic fluorides used as starting materials in the process of the present invention may also be heated by passing them through a reactor made of other refractory material and heated by suitable external means, e. g., an electric induction furnace, to a temperature above 1700° C. Regardless of what means are employed to heat the starting material it is important to rapidly convey the heated gases from the hot zone to the carbon quench reactor, where the gases are contacted with the finely divided carbon.

In carrying out the reaction in the preferred embodiment involving the use of a magnetically rotated arc, Fig. 1, the arc may be operated at low or high voltages and with either direct or alternating current. Especially good results in the pyrolysis step of the present process are obtained when the inorganic fluorides or organic fluorine compounds are passed through rotating arcs produced in the circular gap 3 of two concentric carbon electrodes 1, 2, one of which is hollow as illustrated in the drawing. The power requirements will, of course, depend on the quantity of the starting material which is put through the rotating arc and the temperature to which the gases are to be heated. The rotation of the arc is accomplished by setting up a magnetic field with magnetic field lines running coaxial to the arc electrodes. This causes the arc to move at right angles to the magnetic field lines. The magnetic field can be easily created by surrounding the arc with a coil 5 through which current passes. A suitable field strength to cause rotation is 200 gauss. The arc is estimated to rotate at the speed of 1000 to 10,000 revolutions per second.

In using a graphite tube, as illustrated in Fig. 2, to pyrolyze the starting materials, heaters such as conventional electric resistance heaters may be used. Resistance units in the form of a graphite helix 16 have proven very successful and temperatures up to 2500° C. in the graphite tube have been obtained by passing 900 amperes at about 30 volts D. C. through the resistance unit.

Many designs may be employed in achieving the contacting of the carbon with the pyrolyzed gas. In a preferred method illustrated in the attached drawings a concentric shell 22 and tube 6 made of metal, such as steel, is used. The pyrolyzed gases pass from the hot zone into the tube which has openings 7 to the outer circular shell which acts as a hopper for the carbon. The finely divided carbon is drawn into the inner tube 6, and thoroughly mixed with the reactant gas, which is rapidly cooled down to a temperature at which tetrafluoroethylene is stable. The gases and the finely divided carbon pass from the tube into a separation chamber 8 which is formed by the outer shell above the tube. The excess carbon particles drop back into the hopper 9 formed by the lower part of the shell and the reaction gases are drawn off in baffled vapor outlets 10 which may be provided with suitable filters. Various known means of cooling the carbon or cooling the quench-reactor may be employed to obtain the carbon in the relatively cold form. Where the decomposition product formed is not a gas but a solid, it may be advisable to pass the fluidized, carbon-containing gas into special carbon separation equipment in which the carbon can be purified before recycling. Means for replenishing the carbon are provided in the outer shell 21. If it is desired, the outer and the inner shell may be water cooled by water chases 11, or cooling pipes may be run through the lower part of the outer shell. The temperature of the carbon is determined by thermocouples in the lower part of the outer shell. Any form of carbon, whether amorphous or crystalline, is suitable for the process of this invention, provided the particles are small enough to be fluidized with the pyrolyzed gas stream. Thus there can be used coal, graphite, charcoal and the various forms of carbon black such as lamp black, acetylene black and bone black. It is preferred to use carbon particles which have a large surface, such as particles passing a 100-mesh screen, since the larger the surface of the carbon contacted with the pyrolyzed gas the better the conversion. The quantity of carbon drawn into the reactant gas stream is independent of the particle size, if the particles will pass a 50 mesh screen, and is also independent of the pressure and space velocity of the gas, but can be regulated by size of the openings through which the solid passes into the gas stream. The carbon used in the carbon quench reactor need not be vigorously pure and it can, for example, contain the normal amount of ash, e. g., from 0.5% to 4% by weight. Also some contamination with decomposition products, does not reduce the usefulness of the carbon on recycling. The process of the present invention may be operated over a wide range of conditions, although certain critical limits such as temperature must be maintained. Thus, it is important that the pyrolyzed gaseous reactants, when contacting the fluidized carbon, be at temperatures of 1600° C. and higher when carbon is present in the hot zone to obtain the best conversions possible. As explained hereinabove, fluorocarbon radicals, preferably form carbon tetrafluoride rather than tetrafluoroethylene, if not rapidly quenched from temperatures above 1600° C. The rate of flow should be regulated in such a manner as to make the most efficient use of the equipment and the heating capacity available. For any particular equipment this will, of course, depend on the construction of the equipment. Although it is possible to operate at atmospheric pressure, pressures below 300 mm. of mercury (absolute) are preferred, since better conversions are obtained at lower pressures. The reason for this is not understood. The weight ratio of the carbon to the pyrolyzed gas stream should be preferably 10:1 or higher. The temperature of the carbon when entering the gas stream should be not greater than 500° C. and as low as economically feasible for reasons indicated hereinabove. The contact time for the carbon and pyrolyzed gas stream need not be long, generally below 1 second is sufficient.

The separation of tetrafluoroethylene from the reaction mixture can be accomplished by careful fractional distillation. Since the boiling points of hexafluoroethane and tetrafluoroethylene are quite close, more efficient fractionation is required for separation of tetrafluoroethylene from hexafluoroethane than from carbon tetrafluoride reaction mixtures. Separation by selective solvent extraction or by selective absorption on solids may also be employed.

The process of this invention is further illustrated by the following examples. In these examples the conversion of inorganic fluorides and fluorine compounds to tetrafluoroethylene is carried out in a magnetically rotated arc and in a graphite tube heated by a resistance unit. Details of the magnetically rotated arc are shown in Figure 1. The gaseous starting material enters the pyrolysis chamber (12) at the lower end (13) and is then forced through the gap (3) between the electrodes into the hollow electrode (2). The arc rotating extremely rapidly at the tip of the electrode heats the gas uniformly to very high temperatures above 2000° C. as it passes into the hollow electrode. A field strength of 100 gauss is sufficient to rotate the arc at very high speeds. The rotating arc further increases the linear velocities of the gases, such that the reacted gas passes from the hollow electrode at very high temperatures and velocities into the carbon quench reactor (4), where the gas draws in the finely divided carbon. Through turbulence the reacted gas and the carbon are well admixed and rapid quenching and reaction occurs. The gas-solid mixture passes through the inner quenching or reaction zone (6) made out of high temperature steel into the upper separation chamber (8) where the circulating carbon is separated from the gaseous reaction product and drops back into the carbon reservoir. The gases exit through the baffled gas outlet (10) and are then separated further. The metal construction of the carbon quench reactor and the water cooling applied, as shown in Figure 1, conducted sufficient heat away to keep the temperature of the carbon below 500° C.

Details of the resistance unit are shown in Figure 2. A graphite tube (14) is employed in which the starting material is pyrolyzed. Preferably the graphite tube is impregnated with amorphous carbon to decrease diffusion of the gases through the walls of the tube. Surrounding the graphite tube is a graphite resistor element (15). The resistor element is in the shape of a helix 8" long and 3¾" in diameter with 1" wide ⅝" thick graphite segment. The resistor element can be heated to 2500° C. by passing 900 amperes at about 30 volts D. C. through it. The resistance unit is supported by two metal electrodes (17), (18), and is insulated by porous graphite blocks (19). The graphite tube at the hot zone may be packed with activated carbon.

The reaction temperature is measured through the pyrometer port (20) by an optical pyrometer (not shown) trained on the reaction tube. Attached to the graphite tube slightly above the resistance unit is the carbon quench reactor (14) described hereinabove. Prior to entering the carbon quench reactor the velocity of the pyrolyzed gas is increased by the insert in the graphite tube which narrows the diameter of the graphite tube.

*Example 1.*—This example illustrates the synthesis of tetrafluoroethylene from one of the preferred inorganic fluorides. Phosphorus pentafluoride was charged to the furnace described in Figure 1 at the rate of 500 ml./min. The pressure of the furnace was kept at 60 mm. mercury absolute. The arc was maintained at a voltage of 33.5 volts and at a current of 100 amperes. The arc struck between the .69" solid graphite anode and the .94" inner diameter hollow electrode was rotated by a magnetic field of 100 gauss applied through the coil. The effect of the fluidized carbon was evaluated in the following manner. The furnace was operated without the quench reactor, using in place a graphite quenching tube. Using a graphite quenching tube, the pyrolyzed gases are cooled by contact with the relatively cold graphite tube. Secondly, the furnace was operated with the quench reactor using finely divided sand passing a 100 mesh screen; and thirdly, the quench reactor was operated with carbon passing a 100 mesh screen. The weight ratio of the solid fluidized material contacted was the gaseous reactant stream was 30:1. The following results were obtained. In all three experiments there was a complete conversion of phosphorus pentafluoride to phosphorus trifluoride. All the available fluorine was changed to either fluorocarbon compounds or to silicon tetrafluoride. The composition of these fluorocarbons and the silicon tetrafluoride was as follows. The analytical data was obtained through analysis by mass spectrometry.

|  | No Fluidized Solid Quenching | Fluidized Sand Quench | Fluidized Carbon Quench |
|---|---|---|---|
| Time estimated to cool below 500° C | 10 millisec. | <10 millisec. | <10 millisec. |
| Composition of Products in Mol percent: |  |  |  |
| Tetrafluoroethylene | 32.3% | 50.2% | 81.0%. |
| Carbon Tetrafluoride | 50.6% | 18.6% | 8.3%. |
| Hexafluoroethane | 8.6% | 1.9% | 3.8%. |
| Hexafluoropropylene | 3.6% | 1.5% | 2.4%. |
| Silicon tetrafluoride | 4.9%* | 27.8% | 4.5%*. |

* Impurities in the gas feed.

From these results, the effectiveness of the present process can be clearly demonstrated. The high carbon-tetrafluoride content in the first run indicates the insufficiency of the quenching although extremely rapid and the inadequate quantity of carbon. The improvement obtained by fluidized solid quenching by itself is shown in the second run in which sand is used. The high content of silicon tetrafluoride further shows the presence of reactive fluorine radicals when the fluidized hot reacted gas stream comes into contact with the fluidized solid quenching material. The third run shows the improvement obtained with finely divided carbon as the quenching material, which not only acts as a quenching material but also affects the reaction in such a manner as to increase the yield of tetrafluoroethylene which is more than twice as high compared to a run without fluidized carbon.

*Example 2.*—This example illustrates the synthesis of tetrafluoroethylene from one of the preferred organic fluorine compounds, carbon tetrafluoride. The apparatus illustrated in Figure 1 was employed. The runs tabulated below were made in a similar manner as the ones described in Example 1. The weight ratio of the solid fluidized material to the gaseous reactant was 30:1. The conditions and results are tabulated below. In the first two runs the carbon quencher was replaced by a straight graphite quenching tube.

|  | I | II | III | IV |
|---|---|---|---|---|
| Rate of flow, cc./min | 500 | 5,000 | 5,000 | 5,000 |
| Arc voltage | 23.5 | 58.4 | 57.4 | 57.4 |
| Arc amperage | 100 | 500 | 500 | 500 |
| Fluidized quenching medium | | | Sand | Carbon |
| Pressure, mm. mercury | 75 | 75 | 75 | 75 |
| Composition of Products in Mol percent: | | | | |
| Tetrafluoroethylene percent | 41.3 | 11.1 | 47.9 | 74.6 |
| Carbon tetrafluoride do | 36.6 | 75.8 | 21.4 | 16.7 |
| Hexafluoroethane do | 17.1 | 10.5 | 6.2 | 4.5 |
| Hexafluoropropylene do | 3.1 | 1.1 | 2.7 | 2.9 |
| Silicon tetrafluoride do | *1.3 | *1.5 | 22.3 | *1.3 |

*The formation of silicon tetrafluoride is due to silicon dioxide impurities.

The first two runs show the inadequacy of prior art techniques of increasing the rate of flow of the gas to obtain higher efficiency of the furnace. The third run shows the effect of a quench with a finely divided solid. The last run shows the effect of a carbon quench and how it improves the yield of tetrafluoroethylene obtainable. Again the last two runs indicate the presence of reactive unstable fluorine radicals or compounds in the hot gas stream which by rapid cooling and in the presence of excess carbon preferably form tetrafluoroethylene.

*Example 3.*—This example illustrates the synthesis of tetrafluoroethylene from sulfur hexafluoride employing the rotating arc described in Figure 1. The experiment was carried out using the same size electrodes as described in Example 1. The weight ratio of the solid fluidized carbon contacted with the reactant gas from the rotating arc was 30:1. The feed rate of the gas was 4000 cc./min. at a pressure of 47 mm. mercury (absolute). The arc voltage employed was 48 volts. The amperage of the current was 200 amperes. The strength of the magnetic field was 200 gauss. The spectroscopic analysis of the product obtained showed a complete conversion of the available fluorine to fluorocarbon compounds. The mol percentages of the products obtained were:

| | Percent |
|---|---|
| Tetrafluoroethylene | 64.2 |
| Carbon tetrafluoride | 6.0 |
| Hexafluoroethane | 3.1 |
| Hexafluoropropylene | 0.9 |
| Silicon tetrafluoride [1] | 1.1 |
| Carbon disulfide | 24.7 |

[1] Silicon tetrafluoride is formed as a result of silicon dioxide impurities.

When the carbon quench reactor was replaced by a straight graphite quenching tube the conversion to tetrafluoroethylene under identical conditions was decreased to less than 10 mol percent of the product and the conversion to carbon tetrafluoride was increased to over 80 mol percent.

*Example 4.*—This example illustrates the synthesis of tetrafluoroethylene from arsenic trifluoride using the rotating arc as described in Figure 1. The experiment was carried out with the same size electrodes as described in Example 1. The weight ratio of the solid fluidized material contacted with the reactant gas from the rotating arc was 30:1. The feed rate of the gas was 1000 cc./min. at a pressure of 52 mm. mercury (absolute). The arc voltage employed was 38.4 volts, and the arc amperage 500 amperes. The strength of the magnetic field was 200 gauss. The spectroscopic analysis of the product obtained showed a 64% conversion of available fluorine to fluorocarbon. The mol percentages of the products obtained were:

| | Percent |
|---|---|
| Tetrafluoroethylene | 47.4 |
| Carbon tetrafluoride | 3.2 |
| Hexafluoroethane | 1.2 |
| Hexafluoropropylene | 0.1 |
| Silicon tetrafluoride [1] | 4.7 |
| Arsenic trifluoride | 43.4 |

[1] Silicon tetrafluoride is formed as a result of silicon dioxide impurities.

Replacing the carbon quench reactor by a straight graphite quenching tube, the conversion to tetrafluoroethylene under identical conditions was lowered to 13.2 mol percent of the product.

*Example 5.*—This example illustrates the synthesis of tetrafluoroethylene from sulfur hexafluoride using the furnace described in Figure 2. Sulfur hexafluoride was passed into the resistance furnace at a feed rate of 100 ml./min. at a pressure of 47 mm. mercury (absolute). The furnace was heated to approximately 2500° C. by passing 900 amperes at 30 volts through the resistance units. The weight ratio of the solid fluidized carbon contacted with the gaseous reaction product from the furnace was 20:1. The spectroscopic analysis of the product obtained showed a complete conversion of the available fluorine to fluorocarbon compounds. The mol percentages of the products obtained were:

| | Percent |
|---|---|
| Tetrafluoroethylene | 51.1 |
| Carbon tetrafluoride | 12.2 |
| Hexafluoroethane | 9.4 |
| Hexafluoropropylene | 0.7 |
| Silicon tetrafluoride [1] | 1.3 |
| Carbon disulfide | 25.3 |

[1] Silicon tetrafluoride is formed as a result of silicon dioxide impurities.

Replacing the carbon quench reactor by a straight graphite quenching tube, the conversion to tetrafluoroethylene under identical conditions decreased to 11.6 mol percent of the product.

The examples have illustrated the process of this invention by the preferred embodiment involving passage of inorganic fluorides and organic fluorine compounds through the arc formed between graphite electrodes and through a graphite tube resistance furnace to pyrolyze the starting material followed by contacting the pyrolyzed gas at temperatures about 1700° C. with finely divided carbon at temperatures below 500° C.

The starting materials and the carbon used in the present process are preferably substantially anhydrous.

It will be apparent from the foregoing that the process of this invention provides a process whereby tetrafluoroethylene can be synthesized economically on a large scale. Another advantage is that undesirable fluorocarbon compounds can be recycled to give tetrafluoroethylene.

The foregoing detailed description has been given for clearness of understanding only and no unnecessary limitations are to be understood therefrom.

The invention is not limited to the exact details shown and described for obvious modifications will occur to those skilled in the art.

We claim:

1. The process of synthesizing tetrafluoroethylene comprising pyrolyzing a fluorine compound, capable of decomposition at a temperature above 1700° C., at a temperature of at least 1700° C. and thereafter contacting the pyrolyzed gaseous product while at essentially the same temperature with excess fluidized carbon which is at a temperature below 500° C., and thereafter recovering the tetrafluoroethylene formed.

2. The process of synthesizing tetrafluoroethylene comprising pyrolyzing a fluorine compound, capable of decomposition at a temperature above 1700° C. in the presence of carbon, and thereafter contacting the pyrolyzed gaseous product while at essentially the same temperature with excess fluidized carbon which is at a temperature below 500° C. and thereafter recovering the tetrafluoroethylene formed.

3. The process of synthesizing tetrafluoroethylene comprising pyrolyzing an inorganic fluoride of an element selected from the group consisting of the elements of group VA of the periodic table and those elements of group VIA of the periodic table having atomic numbers between 16 and 52 inclusive at a temperature of at least 1700° C. and thereafter contacting the pyrolyzed gaseous product while at essentially the same temperature with excess fluidized carbon which is at a temperature below 500° C. and thereafter recovering the tetrafluoroethylene formed.

4. The process as set forth in claim 3 wherein the pyrolysis of the inorganic fluorides is carried out in the presence of carbon.

5. The process as set forth in claim 3 wherein the inorganic fluoride is phosphorus pentafluoride.

6. The process as set forth in claim 3 wherein the inorganic fluoride is arsenic trifluoride.

7. The process as set forth in claim 3 wherein the inorganic fluoride is sulfur hexafluoride.

8. The process of synthesizing tetrafluoroethylene comprising pyrolyzing a fluorocarbon compound at a temperature of at least 1700° C. and thereafter contacting the pyrolyzed gaseous product while at essentially the same temperature with excess fluidized carbon which is at a temperature below 500° C. and thereafter recovering the tetrafluoroethylene.

9. The process as set forth in claim 8 wherein the fluorocarbon is carbon tetrafluoride.

10. The process as set forth in claim 8 wherein the fluorocarbon is hexafluoroethane.

11. The process of synthesizing tetrafluoroethylene comprising passing a fluorine compound capable of decomposition at arc temperatures through a rotating arc and thereafter contacting the pyrolyzed gaseous product while at essentially the same temperature with excess fluidized carbon which is at a temperature below 500° C. and thereafter recovering the tetrafluoroethylene.

12. The process set forth in claim 11 wherein the fluorine compound used is phosphorus pentafluoride.

13. The process as set forth in claim 11 wherein the fluorine compound used is arsenic trifluoride.

14. The process as set forth in claim 11 wherein the fluorine compound used is carbon tetrafluoride.

15. The process as set forth in claim 11 wherein the fluorine compound used is sulfur hexafluoride.

References Cited in the file of this patent

UNITED STATES PATENTS

| | | |
|---|---|---|
| 2,485,315 | Rex et al. | Oct. 18, 1949 |
| 2,684,987 | Mantell et al. | July 27, 1954 |
| 2,709,186 | Farlow et al. | May 24, 1955 |
| 2,709,192 | Farlow | May 24, 1955 |
| 2,770,660 | Passino et al. | Nov. 13, 1956 |
| 2,774,797 | Mantell et al. | Dec. 18, 1956 |

UNITED STATES PATENT OFFICE
CERTIFICATE OF CORRECTION

Patent No. 2,852,574 September 16, 1958

Jack Thomas Denison et al.

It is hereby certified that error appears in the printed specification of the above numbered patent requiring correction and that the said Letters Patent should read as corrected below.

Column 3, line 16, for "high" read -- higher --; column 4, line 2, and column 6, line 30, for the numerical reference "(14)", each occurrence, read -- (4) --; column 8, line 66, for "about" read -- above --.

Signed and sealed this 25th day of November 1958.

(SEAL)
Attest:

KARL H. AXLINE
Attesting Officer

ROBERT C. WATSON
Commissioner of Patents